Sept. 10, 1946.  Z. O. ST PALLEY  2,407,521
ELECTRIC PROTECTIVE SYSTEM
Filed Oct. 1, 1943
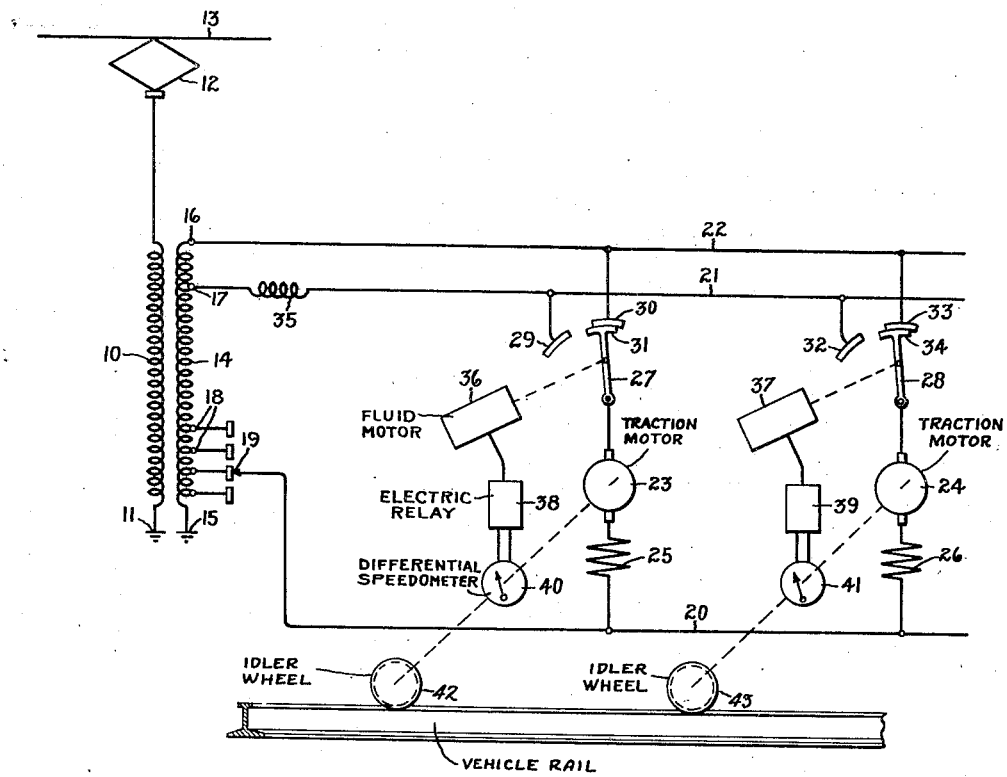
Inventor:
Zoltan O. St. Palley,
by Harry E. Dunham
His Attorney.

Patented Sept. 10, 1946

2,407,521

UNITED STATES PATENT OFFICE 2,407,521

ELECTRIC PROTECTIVE SYSTEM

Zoltan O. St. Palley, Pittsfield, Mass., assignor to General Electric Company, a corporation of New York Application October 1, 1943, Serial No. 504,575

3 Claims. (Cl. 105—61)

My invention relates to electric protective systems for alternating current motors, and, more particularly, to systems for protecting a plurality of alternating current electric traction motors against wheel slippage. The invention has for its principal object the provision of a new and improved protective system of this type which requires only a minimum of apparatus, but functions with optimum efficiency and reliability.

In the operation of a plurality of electric motors separately connected to the driving axles of a vehicle, one pair of wheels connected to an axle sometimes slips on the track, especially when rapid acceleration is attempted under heavy load conditions. When this slipping occurs, the motor connected to the slipping axle accelerates to a higher speed than the other motors and may reach a speed causing damage to the accelerated motor on account of the resulting high mechanical stresses. Furthermore, when the traction motors are connected for energization in parallel circuit relation, the slipping of one pair of wheels relieves the connected motor of any substantial portion of the load so that the remaining motors, connected to non-slipping wheels, may stall or may be damaged by high overload currents.

In carrying out my invention, I provide an alternating current supply transformer having at least two variable voltage taps and arranged to supply current to a plurality of traction motors or traction groups connected in parallel circuit relation. Separate selector switching means are provided in connection with each motor or motor group under the control of a wheel slippage detecting device, such as a differential speedometer, for controlling each selector switch independently to connect each motor to a high or low voltage tap on the transformer in accordance with slippage conditions of that motor. Preferably, and to preclude open-circuiting of any motor, the selector switch associated with each motor or motor group is so arranged that at the instant of transfer the terminals of the variable voltage taps are bridged. In order to prevent short-circuiting of the transformer between taps at the instant of transfer a current limiting impedance is interposed between the transformer and the first connected switching means in such a position that it serves to prevent short-circuiting of the variable voltage taps by any of the connected switching means.

For a more complete understanding of my invention, reference should now be had to the following detailed specification taken in conjunction with the accompanying drawing, the single figure of which is a diagrammatic representation of my invention as applied to an electrically operated vehicle, such as an electric locomotive.

Referring now to the drawing, I have shown an alternating current supply transformer having a primary winding 10 with one terminal grounded at 11 and the other terminal connected through a pantograph 12 to a supply conductor 13. The supply transformer is provided also with a secondary winding 14 having one terminal grounded at 15 and having at its other end two electrically spaced voltage taps 16 and 17. To facilitate motor starting the grounded end of the transformer winding 14 may, if desired, be provided with a plurality of taps 18 to which the motor circuit is sequentially connected by means of a suitable manually operable accelerating controller diagrammatically illustrated as a slider 19.

To the secondary winding 14 of the supply transformer there are connected three conductors 20, 21, and 22 for connecting a plurality of electric traction motors in parallel circuit relation. While the conductors 21 and 22 are electrically spaced apart in potential by reason of the spacing of the taps 16 and 17, the potential difference between the conductors 21 and 22 is small in relation to that between either one of these conductors and the conductor 20. Accordingly, I wish to have it understood that for the purposes of this specification, the term "parallel circuit relation" shall be understood to mean connections between the conductor 20 and either one of the conductors 21 or 22.

A pair of series type electric traction motors having armatures 23 and 24 and series field windings 25 and 26, respectively, are connected in parallel circuit relation across the transformer secondary winding 14. It will be understood that the motor armatures 23 and 24 are separately connected to independent driving axles of an electric vehicle (not shown). One terminal of each of the traction motors is connected to the conductor 20. The other terminals of the motors are connected to separate tap changing or selector switches 27 and 28. The selector switch 27 is associated with the traction motor 23, 25 and comprises a pair of fixed contacts 29 and 30 connected, respectively, to the conductors 21 and 22 and moving contact 31. Similarly, the tap changing switch 28 comprises a pair of fixed contact members 32 and 33 connected, respectively, to the conductors 21 and 22 and a moving contact 34. To prevent short-circuiting of the transformer taps 16 and 17 I provide in one of the wires 21 or 22 between the supply transformer and the first connected selector switch a current limiting impedance, such as a reactor 35 in the conductor 21.

The selector switches 27 and 28 are each actuated by a separate differential speed responsive mechanism which compares the speed of the associated traction motor or driving axle with a standard speed, such as that of an idler wheel upon the vehicle. It will be understood that the particular form of such differential speed responsive mechanism is not an essential feature of my invention. For the purpose of illustration I have shown the tap changing switches 27 and 28 connected for actuation by suitable valve-controlled air or fluid motors 36, 37, respectively, the fluid motor valve being controlled by suitable electromagnetic relays 38, 39, respectively, which are in turn controlled, respectively, by contact-making differential speedometers 40 and 41. The differential speedometer 40 is connected between the wheel or axle driven by the motor 23, 25 and suitable idler wheel 42 to detect slipping of the associated driving wheel, while the differential speedometer 41 is connected between the wheel or axle driven by the motor 24, 26 and an idler wheel 43 for a like purpose. It will of course be understood that, if desired, both differential speedometers may be connected to the same idler wheel.

I wish to have it understood also that, while I have shown single motors 23, 25 and 24, 26 connected in parallel circuit relation across the secondary winding 14 of the supply transformer, it is within the scope of my invention to substitute for each of these motors a group of motors connected in series or parallel circuit relation with respect to each other.

In view of the foregoing explanation of the construction and arrangement of the various parts of my invention, it is believed that its mode of operation will be clear from the following brief description. Let it be assumed that the motors have been energized by proper actuation of the accelerating controller 19 and that the wheels connected to the armature 23 begin to slip. With such slippage and loss of traction, the armature 23 speeds up very rapidly and causes actuation of the relay 38 through the differential speedometer 40. When the relay 38 is operated, the air or fluid motor 36 actuates the moving contact 31 of the selector switch 27 from the high voltage tap 30 to the low voltage tap 29 thereby to reduce the voltage applied to the traction motor 23, 25 without affecting the voltage applied to the traction motor 24, 26. It will be noted that the contact 31 is so constructed that at the instant of transfer of connections from the contact 30 to the contact 29 the two stationary contacts 29 and 30 are bridged by the moving contact 31. At this instant, the variable voltage taps 16 and 17 on the transformer winding 14 would be short-circuited were it not for the current limiting impedance 35. It will also be noted that, by reason of the interposition of the impedance 35 between the transformer tap 17 and the first connected tap changing motor switch, the impedance 35 serves to prevent short-circuiting of the transformer tap by any of the connected motor tap changing switches.

The reduced voltage thus applied to the motor 23, 25 reduces the torque of this motor and prevents further slipping of the wheels. As soon as the wheel slip is stopped, the differential speedometer 40 and control relay 38 effect reversal of the fluid motor 36 so that the selector switch 27 is moved back to the position shown in the drawing.

In view of the foregoing description, it will now be evident that I have provided a wheel slippage protective system for an electric vehicle driven by parallel connected alternating current motors which is not only new and novel, but is particularly attractive because of its simplicity and selectability. My system not only provides complete and independent protection for each traction motor or motor group, but it does so with a minimum amount of switching equipment. It will be particularly noted that only three electric conductors extend between the supply transformer and the traction motors, and that only a single current limiting impedance is needed to provide short-circuit protection for all or any one of the motor tap changing switches.

While I have illustrated only a single preferred embodiment of my invention by way of illustration, many further modifications will occur to those skilled in the art and I therefore wish to have it understood that I intend in the appended claims to cover all such modifications as fall within the true spirit and scope of my invention.

What I claim as new and desire to secure by Letters Patent of the United States is:

1. A protective system for independently preventing excessive overspeeding of each of a plurality of driving axles of an electrically driven vehicle with respect to an idler wheel of said vehicle comprising a plurality of alternating current traction motors separately connected to said driving axles, a supply transformer having a plurality of voltage taps, separate switching means for connecting one terminal of each of said motors independently to selected taps of said transformer, differential speed responsive means connected between an idler wheel and each of said driving wheels for independently controlling each of said switching means to select said taps, and means connecting the other terminals of said motors together and to selectable taps upon said transformer to accelerate said motors.

2. A protective system for independently preventing excessive overspeeding of each of a plurality of driving axles of an electrically driven vehicle with respect to an idler wheel of said vehicle comprising a plurality of alternating current traction motors separately connected to said driving axles, a supply transformer having a secondary winding provided with a plurality of variable voltage taps at each end thereof, means for connecting one terminal of each of said motors together and to selective taps at one end of said secondary winding to accelerate said motors, separate selector switching means for independently connecting the other terminals of each of said motors to a selected one of said voltage taps at the opposite end of said secondary winding, and differential speed responsive means connected between an idler wheel and each of said driving axles for controlling each of said selector switches independently to reduce the voltage applied to any slipping motor.

3. A protective system for independently preventing excessive overspeeding of each of a plurality of driving axles of an electrically driven vehicle with respect to an idler wheel of said vehicle comprising a plurality of alternating current traction motors separately connected to said driving axles, a single supply transformer having a first terminal and at least two voltage taps differently spaced therefrom in potential, means for connecting one terminal of each of said motors to said first terminal of said transformer, separate selector switching means for independently connecting the other terminals of each of said motors to a selected one of said voltage taps of said single transformer, differential speed responsive means connected between an idler wheel and each of said driving axles for controlling each of said selector switches independently to control the voltage applied to said motors, and a current limiting impedance interposed between at least one of said voltage taps and said switching means to prevent short-circuiting of said transformer between said taps upon actuation of said switching means.

ZOLTAN O. ST. PALLEY.